US011879043B2

(12) United States Patent
Riviello et al.

(10) Patent No.: US 11,879,043 B2
(45) Date of Patent: Jan. 23, 2024

(54) COATED POLY-OLEFINS (71) Applicant: DIONEX CORPORATION, Sunnyvale, CA (US)

(72) Inventors: John M. Riviello, Los Gatos, CA (US); Christopher A. Pohl, Union City, CA (US)

(73) Assignee: Dionex Corporation, Sunnyvale, CA (US)

( * ) Notice: Subject to any disclaimer, the term of this patent is extended or adjusted under 35 U.S.C. 154(b) by 0 days.

(21) Appl. No.: 17/559,830

(22) Filed: Dec. 22, 2021

(65) Prior Publication Data
US 2022/0315720 A1 Oct. 6, 2022

Related U.S. Application Data (60) Provisional application No. 63/170,950, filed on Apr. 5, 2021.

(51) Int. Cl.
*C08J 7/04* (2020.01)

(52) U.S. Cl.
CPC ......... *C08J 7/0427* (2020.01); *C08J 2323/06* (2013.01); *C08J 2351/00* (2013.01); *C08J 2425/02* (2013.01)

(58) Field of Classification Search
CPC ............... C08J 2323/02; C08J 2323/04; C08J 2323/06; C08J 2351/00; C08J 2425/02; C08J 2425/08; C08J 7/0427; C09D 125/08
See application file for complete search history.

(56) References Cited

U.S. PATENT DOCUMENTS

| | | | |
|---|---|---|---|
| 4,101,460 A | 7/1978 | Small et al. | |
| 5,532,279 A * | 7/1996 | Barretto | B01J 39/26 210/680 |
| 5,798,261 A | 8/1998 | Koontz | |
| 6,818,529 B2 | 11/2004 | Bachrach et al. | |
| 7,311,825 B2 | 12/2007 | Shah | |
| 8,318,824 B2 | 11/2012 | Matsuoka et al. | |
| 10,118,171 B2 | 11/2018 | Woodruff et al. | |
| 2007/0256970 A1* | 11/2007 | DiLeo | B01J 20/28042 210/502.1 |
| 2008/0223787 A1 | 9/2008 | Dasgupta et al. | |
| 2011/0217539 A1 | 9/2011 | Bonner et al. | |
| 2019/0283000 A1* | 9/2019 | Pohl | B01L 3/508 |

OTHER PUBLICATIONS

Fouad et al., "Porous Polyethelene Coated with Functionalized Hydroxyapatite Particles as a Bone Reconstruction Material," Materials, 2018, vol. 11, No. 521, 18 pgs.

(Continued)

*Primary Examiner* — Hai Vo
(74) *Attorney, Agent, or Firm* — BakerHostetler (57) ABSTRACT

A coated substrate that comprises a polyolefin substrate having a functional polymer layer disposed thereon. The polyolefin substrate has a flow through pore structure with a pore size ranging from about 5 microns to about 250 microns. The functional polymer layer has a thickness ranging from about 1 micron to about 20 microns and a layer pore structure having a pore size ranging from about 1 nm to about 100 nm.

21 Claims, 9 Drawing Sheets

(56) References Cited

OTHER PUBLICATIONS

Koontz et al., "The Pellicular Monolith: Pore-surface Functionalization and Surface-phase Construction in Macroporous Polymeric Materials," Colloid and Polymer Science, 1999, No. 277, pp. 557-562.
Sengupta et al., "Modification of Porous Polyethylene Scaffolds for Cell Attachment and Proliferation," International Journal of Nanomedicine, 2018, No. 13, pp. 87-90.
International and Search report dated Mar. 16, 2022, issued to PCT Application No. PCT/US2021/065193.

* cited by examiner

Uncoated, 10,000X

Coated, 10,000X

Figure 3

Comparison of Uncoated and Coated
Sintered Polyethylene Porex 4902

Uncoated, 500X

Coated, 500X

Uncoated,
5,000X

Coated,
5,000X

COATED POLY-OLEFINS

PRIORITY INFORMATION

The present application claims priority to U.S. Provisional Patent Application No. 63/170,950, filed on Apr. 5, 2021, and entitled "COATED POLYOLEFINS" the contents of which are hereby incorporated by reference in their entirety.

BACKGROUND

Porous polymers can be used as sorbents in preparing samples for analytical separations and analysis. The porous polymer can be used for analyte retention, concentration, or matrix elimination. In some cases, the porous polymer is immersed into a liquid sample to adsorb an analyte, then immersed into an eluting solvent. Polymers can have high surface areas, which can correspond to adsorption capacity, but historically it has been challenging to formulate a polymer having relatively high adsorption capacity along with high liquid permeability. Accordingly, there is a long-felt need in the art for such polymers.

SUMMARY

In meeting the described long-felt needs, the present disclosure provides a coated substrate that comprises a polyolefin substrate having a functional polymer layer disposed thereon. The polyolefin substrate has a flow through pore structure with a pore size ranging from about 5 microns to about 250 microns. The functional polymer layer has a thickness ranging from about 1 micron to about 20 microns and a layer pore structure having a pore size ranging from about 1 nm to about 100 nm.

The coated substrate can be formed by the process of providing a polyolefin substrate. One or more porogen, one or more monomer, and a polymerization initiator are combined with the polyolefin substrate. The monomer is polymerized to form the functional polymer layer on the polyolefin substrate.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

A coated substrate comprises a polyolefin substrate having a functional polymer layer disposed thereon. In some embodiments, the polyolefin substrate comprises polyethylene, polypropylene, polymethylpentene, polynorbornene, cyclic olefin copolymers, or combinations thereof. In some embodiments, the polyolefin substrate comprises polyethylene, polypropylene, or both. The polyolefin substrate has a flow through pore structure with a pore size ranging from 5 microns to 250 microns. The functional polymer layer has a thickness ranging from 1 micron to 20 microns and a layer pore structure having a pore size ranging from about 1 nm to 100 nm. In some embodiments, the polyolefin substrate is different than the functional polymer layer.

Pores can be classified by their connectedness. Pores that open externally are called open pores and are accessible for molecules, provided their relative size is correct, to fit inside them. Open pores may have a dead end or be open ended. A dead-end pore may be termed a blind pore. An open-ended pore connects to other openings so has communication through the material to other opening, any may be termed flow through pores. Layer pores are those that exist in the functional polymer layer and may be made up of open pores and flow through pores.

The functional polymer layer is a layer disposed on the polyolefin substrate. It may be considered a coating. In some embodiments, the layer completely covers the polyolefin substrate. In some embodiments, the layer partially covers the polyolefin substrate.

In some embodiments, the coated substrate has a total pore volume that ranges from about 5% to about 70%. Examples of total pore volume ranges include 0% to 5%, 5% to 10%, 10% to 15%, 15% to 20%, 20% to 25%, 25%, to 30%, 30% to 35%, 35% to 40%, 45% to 50%, 50% to 55%, 55% to 60%, 60% to 65%, 65% to 70% or a range defined by the combination of two or more of the foregoing ranges.

The total pore volume is the sum of the volume of the flow through pores in the polyolefin substrate and the volume of the layer pores. The total pore volume is the percentage of the volume that are the pores compared to the overall volume of the coated substrate.

The coated substrate can be used as a device for performing solid phase extraction or to facilitate analyte loading and/or elution with solvent. For example, it can be associated with a support. Examples include, but are not limited to, syringe barrel cartridges, chromatography columns, integrated sample preparation, injection and detection device, membranes, microfluidics devices, pipette tips, multi-welled plates, strip, plate, disk, hollow tube, rod, and the like, and other supports can be used. A support can be hydrophobic, hydrophilic, or capable of being rendered hydrophilic or hydrophilic. The coated substrate can be disposed on a surface of the supporting device or embedded within a channel or tube within the device.

In some embodiments, the polyolefin substrate is a porous material comprising polyethylene, polypropylene, polymethylpentene, polynorbornene, cyclic olefin copolymers, or combinations thereof. In some embodiments, the polyolefin substrate comprises polyethylene (PE). In some embodiments, the polyolefin substrate comprises polypropylene (PP). In some embodiments, the polyolefin substrate comprises both PE and PP. It has a flow through pore structure with pore sizes ranging from 5 microns to 250 microns. Such as 5 microns to 25 microns, 25 microns to 50 microns, 50 microns to 75 microns, 75 microns to 100 microns, 100 microns to 125 microns, 125 microns to 150 microns, 150 microns to 175 microns, 175 microns to 200 microns, 200 microns to 225 microns, 225 microns to 250 microns, or a range defined by the combination of two or more of the foregoing ranges. It should be noted that a pore size can have an irregular shape, but that pore sizes are represented here as an approximation of an equivalent pore diameter if it were spherical in shape.

In some embodiments, the polyolefin substrates can be any porous solid structure providing sufficient solvent and analyte access and porosity. Example structures of the polyolefin substrate include, but are not limited to, fibers, sheets, screens, discs, rods, tubes, woven mesh, pressed or molded shapes, and sintered articles. The fibers can be fibers woven into fabrics or made into non-woven mats or thin paper-like sheets. In some embodiments, the polyolefin substrate comprises sintered particles. Sintered particles can be a porous mass formed by fusing particles together through heat or pressure without liquifying the particles. The polyolefin particles can be non-porous and irregularly shaped or spherically shaped. However, the fusing of the non-porous particles together forms a void volume that provides porosity to the resulting sintered particles. This void volume form liquid passageways through the porous mass and can be referred to as flow through pores.

In some embodiments, the polyolefin substrate is not porous.

In some embodiments, prior to coating, the polyolefin substrate had a surface area of from about 0.1 $m^2/g$ to about 1 $m^2/g$. Examples of the surface area include, but are not limited to 0.1 $m^2/g$ to about 0.2 $m^2/g$, 0.2 $m^2/g$ to about 0.3 $m^2/g$, 0.3 $m^2/g$ to about 0.4 $m^2/g$, 0.4 $m^2/g$ to about 0.5 $m^2/g$, 0.5 $m^2/g$ to about 0.6 $m^2/g$, 0.6 $m^2/g$ to about 0.7 $m^2/g$, 0.7 $m^2/g$ to about 0.8 $m^2/g$, 0.8 $m^2/g$ to about 0.9 $m^2/g$, 0.9 $m^2/g$ to about 1 $m^2/g$, or a range defined by the combination of two or more of the foregoing ranges.

The functional polymer is coated on the substrate as a thin layer. The mass ratio of the functional polymer layer to the polyolefin substrate ranges from 1/100 to about 50/100. For example, the mass ratio can be represented as the mass of monomer for the functional polymer incorporated into the polyolefin substrate divided by the mass of the polyolefin substrate (e.g., ratio=monomer mass for functional polymer/ polyolefin substrate mass). The functional polymer is formed by polymerization of monomers to form the layer on the polyolefin substrate. In some embodiments, the ratio of monomer to substrate is 1/100 to 50/100, by mass prior to polymerization. Examples of the ratios range from 1/100 to 50/100, 10/100 to 50/100, 20/100 to 50/100, 30/100 to 50/100, 40/100 to 50/100, 1/100 to 40/100, 1/100 to 30/100, 1/100 to 20/100, 1/100 to 10/100, or a range defined by the combination of two or more of the foregoing ranges.

In some embodiments, the functional polymer layer is not covalently bound to the polyolefin. It is believed that the use of a porogenic solvent partially dissolves the polyolefin substrate to allow a physical mixing of the polyolefin structure and the functional polymer as it is formed.

Figure 9:
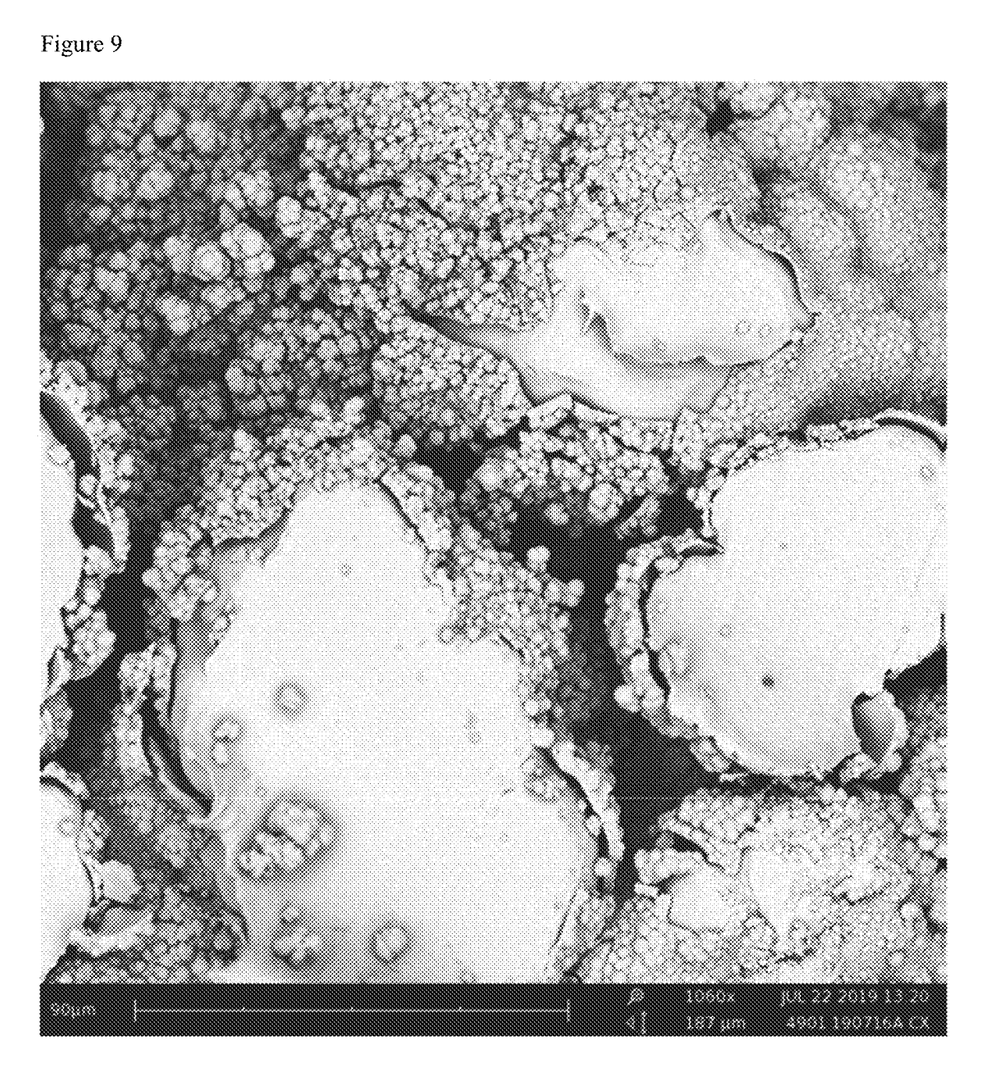
FIG. 9 is a scanning electron microscope micrograph of a cross section of coated substrate.

The functional polymer layer thickness ranges from 1 micron to 20 microns, such as from 1 micron to 5 microns, 5 microns to 10 microns, 10 microns to 15 microns, 15 microns to 20 microns, or a range defined by the combination of two or more of the foregoing ranges. In some embodiments, the layer is homogenous. A functional polymer layer is homogenous when a dye is distributed throughout the coated substrate as in Example 3. The thickness of the functional polymer layer may be seen in a cross-section SEM, such as shown in FIG. 9.

The functional polymer has a layer pore structure having a pore size ranging from about 1 nm to 100 nm, such as 1 nm to 10 nm, 10 nm to 20 nm, 20 nm to 30 nm, 30 nm to 40 nm, 40 nm to 50 nm, 50 nm to 60 nm, 60 nm to 70 nm, 70 nm to 80 nm, 80 nm to 90 nm, 90 nm to 100 nm, or a range defined by the combination of two or more of the foregoing ranges. The layer pore structure refers to the pores within the functional polymer. The functional polymer is configured to bind chemicals and/or ions from a liquid solution. The layer pore structure is believed to be formed in part by the use of a porogenic solvent during the formation of the functional polymer layer.

Since the functional polymer contains many pores, it has a large surface area. In some embodiments, the surface area is from about 25 $m^2/g$ to about 800 $m^2/g$, such as about 300 $m^2/g$ to about 800 $m^2/g$, such as about 300 $m^2/g$ to about 400 $m^2/g$, about 400 $m^2/g$ to about 500 $m^2/g$, about 500 $m^2/g$ to about 600 $m^2/g$, about 600 $m^2/g$ to about 700 $m^2/g$, about 700 $m^2/g$ to about 800 $m^2/g$, or a range defined by the combination of two or more of the foregoing ranges.

The functional polymer can have hydrophobic, hydrophilic, intermediate hydrophobicity/hydrophilicity, ion exchange and affinity moieties. These moieties provide different functionality for the functional polymer layer. In some embodiments, the layer is present on the surface of the polyolefin substrate and is a homogenous layer of the polyolefin.

In some embodiments, the coated substrate further comprises one or more additional (or second, third, . . . ) functional polymer layers on top of the functional polymer layer. The second functional polymer layer can be hydrophobic, hydrophilic, or has ion exchange functionality. It can partially cover the functional polymer layer below it or fully cover the functional polymer layer below it. Depending on the additional functional polymer layer, subsequent chemistry can be applied to. For example, a second functional polymer layer of styrene/DVB and n-heptane will be non-polar (hydrophobic). This functional polymer layer can be sulfonated, creating a cation exchange phase which is polar (hydrophilic/water wettable). A functional polymer layer of vinylbenzylchloride (VBC)/divinylbenzene (DVB) and n-heptane can be aminated to produce an anion exchange phase. A DVB functional polymer layer can be grafted with a variety of vinyl monomers to produce polar and/or ion exchange phases. In another embodiment, where the functional polymer layer comprises negatively charged sulfonate groups, positively charged anion exchange particles (e.g., latex particles) can be ionically bound to the negatively charged sulfonate groups.

The functional polymer is formed from a solution of monomers on the polyolefin substrate. The monomers can be hydrophobic and/or hydrophilic monomers and includes at least one crosslinking moiety. Examples of aromatic (styrenic) monomers include styrene, DVB, VBC, ethylvinylbenzene (EVB) and derivatives thereof. Hydrophilic monomers include acrylates, methacrylates and derivatives thereof. In some embodiments, the functional polymer comprises a polymer formed from monomers selected from styrene, DVB, VBC, EVB, acrylates, methacrylates, derivatives thereof, and combinations thereof. In some embodiments, the functional polymer comprises a copolymer formed from the monomers DVB and EVB, It should be noted that in one embodiment technical grade DVB can contain 80% DVB (both meta and para isomers) along with about 20% EVB as an impurity. In some embodiments the functional polymer is crosslinked. Crosslinking monomers include any monomer with two or more groups capable of forming covalent bonds with a monomer, oligomer or polymer chain. In the case of VBC co-polymers, the VBC group of the copolymer can be reacted with an amine to form an attached amine group for providing an anion exchange phase.

Porogenic Solvents

The polymer formed upon the polyolefin substrate is porous, which is generated by the use of a porogenic solvent. A porogenic solvent dissolves in the monomer mixture and partially solubilizes or swells the polyolefin substrate. It is not a solvent for the resulting polymer. The Hildebrand solubility parameter (delta, δ) can be used as an approximate guide for predicting the interaction of a porogen with the substrate. In general, the closer the δ value of the porogen and substrate, the more likely the porogen will solvate or swell the polyolefin substrate. Example Hildebrand solubility parameter for PE and PP are in the range of 16-17 $MPa^{0.5}$. In some embodiments, partially solubility means the different between the porogen δ and the polyolefin substrate δ is 4 or less, such as 3 or less, 2 or less, and 1 or less. Suitable porogenic solvents include, but are not limited to, aliphatics, such as hexane, heptane, octane and decane; cycloaliphatics, such as cyclopropane, methylcyclohexane and heptalene; aromatic hydrocarbons, such as toluene, xylene, ethylbenzene and diethylbenzene; halogenated aromatics; and halogenated aliphatics, such as dichloromethane, dichloroethane and trichloroethane. In some embodiments, the porogen is an aliphatic, such as hexane, heptane, octane, decane, and combinations thereof. The porogenic solvents can be used individually or in combination of two or more thereof. In some embodiments, the porogen to monomer ratio is 1/10 to 400/10 by mass, such as 1/10 to 10/10, 10/10 to 50/10, 50/10 to 100/10, 100/10 to 150/10, 150/10 to 200/10, 200/10 to 250/10, 250/10 to 300/10, 300/10 to 350/10, 350/10 to 400/10, or a range defined by the combination of two or more of the foregoing ranges. As an example, porogen to monomer ratio can be represented as a mathematical formula where the ratio=mass of porogen/ mass of monomer. In some embodiments, the one or more porogen includes n-heptane and the one or more monomer includes divinylbenzene, and the porogen to monomer weight ratio ranges from 1/1 to 20/1.

In some embodiments, for non-polar monomers (such as aryl monomers like styrene, vinyl benzyl chloride, divinylbenzene), examples of porogens include hexane, heptane, octane, cyclohexanol, decanol, dodecanol, benzene, toluene, tetrahydrofuran, and halogenated porogens like chlorobenzene, trichloroethylene, trichloromethane. In some embodiments, for polar monomers (such as acrylates), examples of porogens include methanol, butanol, methyl-isobutyl ketone, dimethylformamide, and dimethylsulfone. In some instances, mixtures of porogens can be used to affect the surface area and pore size of the functional porous polymer layer.

Method of Coating the Substrate

The coated substrate is formed by the process of providing a polyolefin substrate. The porogen, one or more monomer, and a polymerization initiator are combined with the polyolefin substrate. The monomer is polymerized to form the functional polymer layer on the polyolefin substrate. The monomer and polyolefin substrate mixture are agitated during at least part of the polymerization.

Examples of polymerization initiators include radical polymerization initiators such as benzoyl peroxide, dicumyl peroxide, 4,4-Azobis(4-cyanovaleric acid), diisopropyl peroxydicarbonate, t-butyl peroxy-2-ethylhexanoate, t-butyl peroxypivalate, t-butyl peroxydiisobutyrate, lauroyl peroxide, dimethyl 2,2'-azobisisobutyrate (MAIB), azobisisobutyronitrile (AIBN) and azobiscyclohexanecarbonitrile (CAN).

In one embodiment, polyolefin substrate is combined with a monomer solution containing one or more monomers, one or more porogens, and a polymerization initiator. In some embodiments, the porogen also acts as a swelling agent for the polyolefin substrate. The sealed vessel containing the polyethylene particles and monomer solution is placed on an agitation device and heated until polymerization is complete. Examples of agitation include, but are not limited to rotation, shaking, and tumbling.

After polymerization, the coated substrate can be cleaned chemically to remove any unreacted monomer, porogen, and reaction by-products. Cleaning can include the use of organic solvents, solutions of acids, bases and/or salts with stirring, agitation, ultrasonication and/or heating.

In some embodiments, a secondary chemistry step is performed on the polymer coated polyolefin. These include adding additional functional groups to impart, but not limited to, specific hydrophobic, hydrophilic and ion exchange functionalities. Multiple chemistry steps can be performed to impart the desired functionality.

The ability to coat permeable and impermeable porous polyolefin substrates with hydrophobic and hydrophilic porous polymers was unexpected based upon the "inertness" of polyolefins. The fact that the polymer uniformly coats the permeable substrate without filling or plugging the through pores of the impermeable substrate was also a surprising result where the coated substrate can allow liquid flow through at flow rates of up to 20 mL/min under low pressure or vacuum, such as 2 atmospheres, with the coated substrate in a thin disk format and be capable for adsorbing chemicals. Ion exchange coated substrates have capacities in the range of 0.1 to 3 milliequivalents/gram of the coated substrate. Non-polar (reversed-phase) coated substrates may have loading capacities in the range of 0.05 to 1 milliequivalents/gram of the coated substrate. As an example, hydrophobic material that can load on a non-polar coated substrate can be xylene. Thus, the coated substrates can be configured to be mounted in a laboratory pipette tip for changing or altering the chemical composition of the outputted solutions at relatively low pressures. This change in chemical composition can be caused by binding ions, analytes, and/or matrix chemical from the inputted liquid sample. In some instances, the inputted liquid sample can be acidic or basic, and then be partly or fully neutralized through ion exchange with hydronium or hydroxide ions so that the outputted liquid from the coated substrate has a changed or neutral pH. In an embodiment, the coating occludes about 5% to 75% of the void volume. The ability to coat these inert polyolefin substrates with polymers that allow for subsequent chemical reaction, opens up the possibility of a very broad range of functional polymers to be applied for specific applications.

EXAMPLES

Example 1. Extruded Polypropylene Mesh with a Functional Polymer Layer

Disks of a diameter of 7.9 mm were punched from Industrial Netting Discs XN5340 which is an extruded polypropylene mesh 0.031" thick with holes that are 0.033"× 0.045". The nominal open area is about 30%.

The screens (1.0 g) were added to a 20 ml scintillation vial. Next, 1.0 g of monomer solution containing 3.0 parts n-heptane and 1.0 part of a 80% divinylbenzene (DVB) solution by mass with 0.25% AIBN was added (equal mass of monomer solution and screen). The vial was heated to 65° C. and agitated for 72 hours. The vial was removed, and the discs rinsed with clean 10 mL acetone (twice) and dried. Mass increase of the screens was about 6% indicating the coating process was successful.

Figure 1:
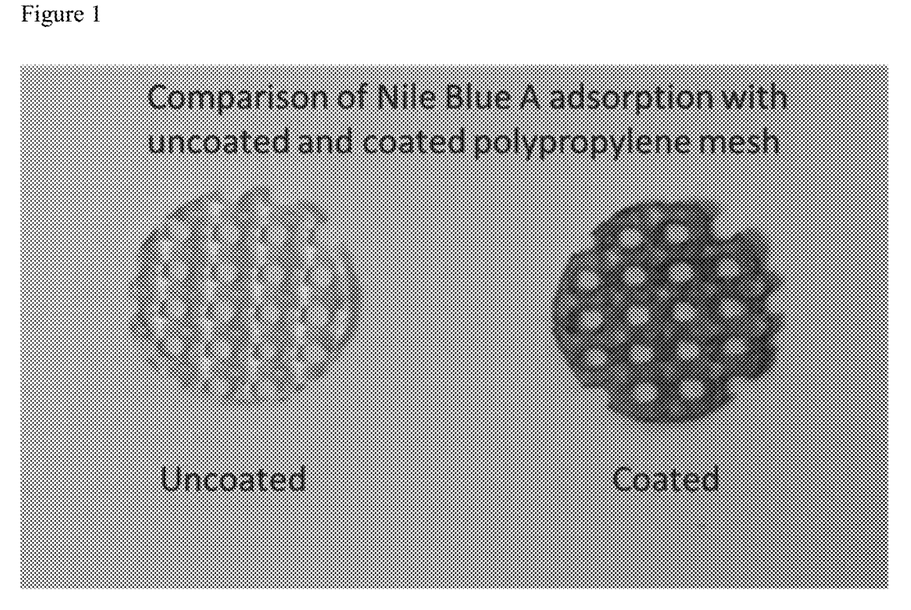
FIG. 1 is a picture of uncoated and coated polypropylene mesh that were exposed to Nile Blue A.

Disc of untreated and treated screens were place in 4 mL of 30 ppm Nile Blue A with 1% IPA (for wetting). FIG. 1 is a photo of the screen after 48 hours. The disc on the left is the untreated (raw) screen and the disc on the right the coated/treated screen, which shows that the Nile Blue was adsorbed onto the coated polypropylene.

Example 2. Polyethylene Particles with a Functional Polymer Layer

Mitsiu Chemical Mipelon PM-200 consists of 10 micron high molecular weight polyethylene particles. Into a 20 ml vial, 1.00 g of Mipelon and 5.00 g of 20 parts n-heptane and 1 part divinylbenzene (80% purity) with 1% AIBN (of the divinylbenzene mass) as the thermal free radical initiator were added. The vial was heated to 65° C. and agitated for 52 hours. After polymerization, the particles were allowed to settle, the excess liquid (n-heptane) was decanted. The particles were then rinsed with three aliquots of acetone (15 mL per aliquot) to remove any excess monomer or porogen. The supernatant was cloudy for the first two rinses indicating some particles and colloidal DVB. After the final rinse, the vials were placed in the oven with the caps off for one hour to dry.

Figure 2:
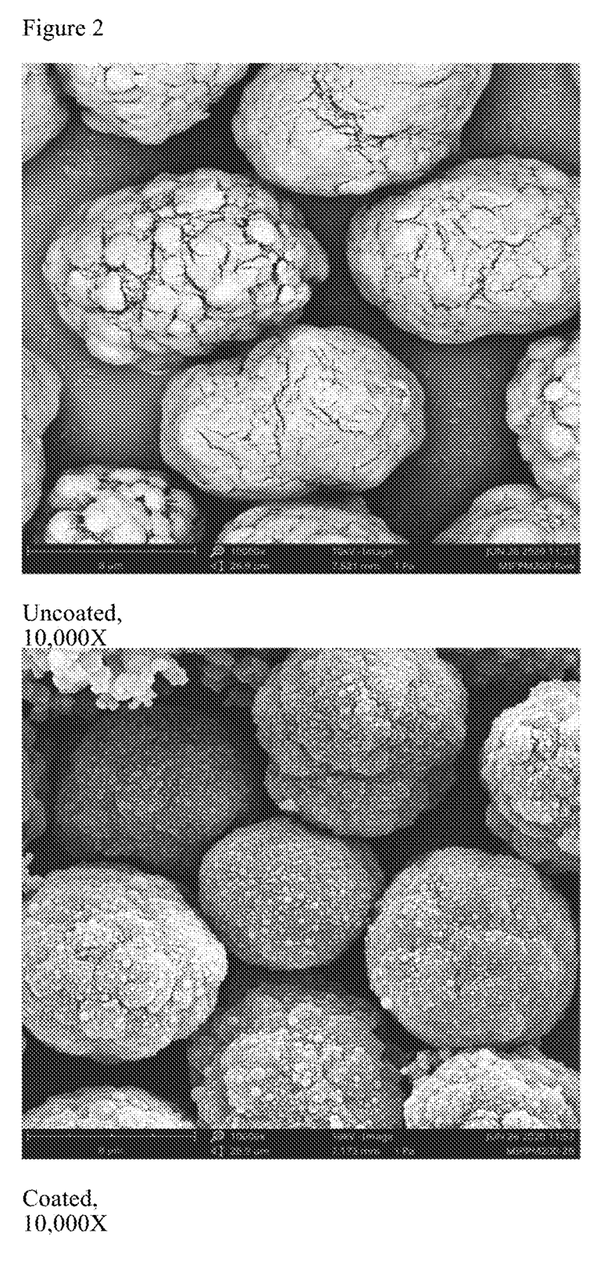
FIG. 2 provides scanning electron micrographs of uncoated and coated polyethylene particles.

The scanning electron micrographs in FIG. 2 show the uncoated and coated polyethylene particles. A thin layer of the DVB polymer, as well as colloidal size particles of the polymer can be seen throughout the surface of the PE particles. The DVB polymer layer can be derivatized to add additional chemical functionality, including hydrophilic and/or ion exchange groups

Example 3. Sintered Polyethylene Substrate with a Functional Polymer Layer

Figure 3:
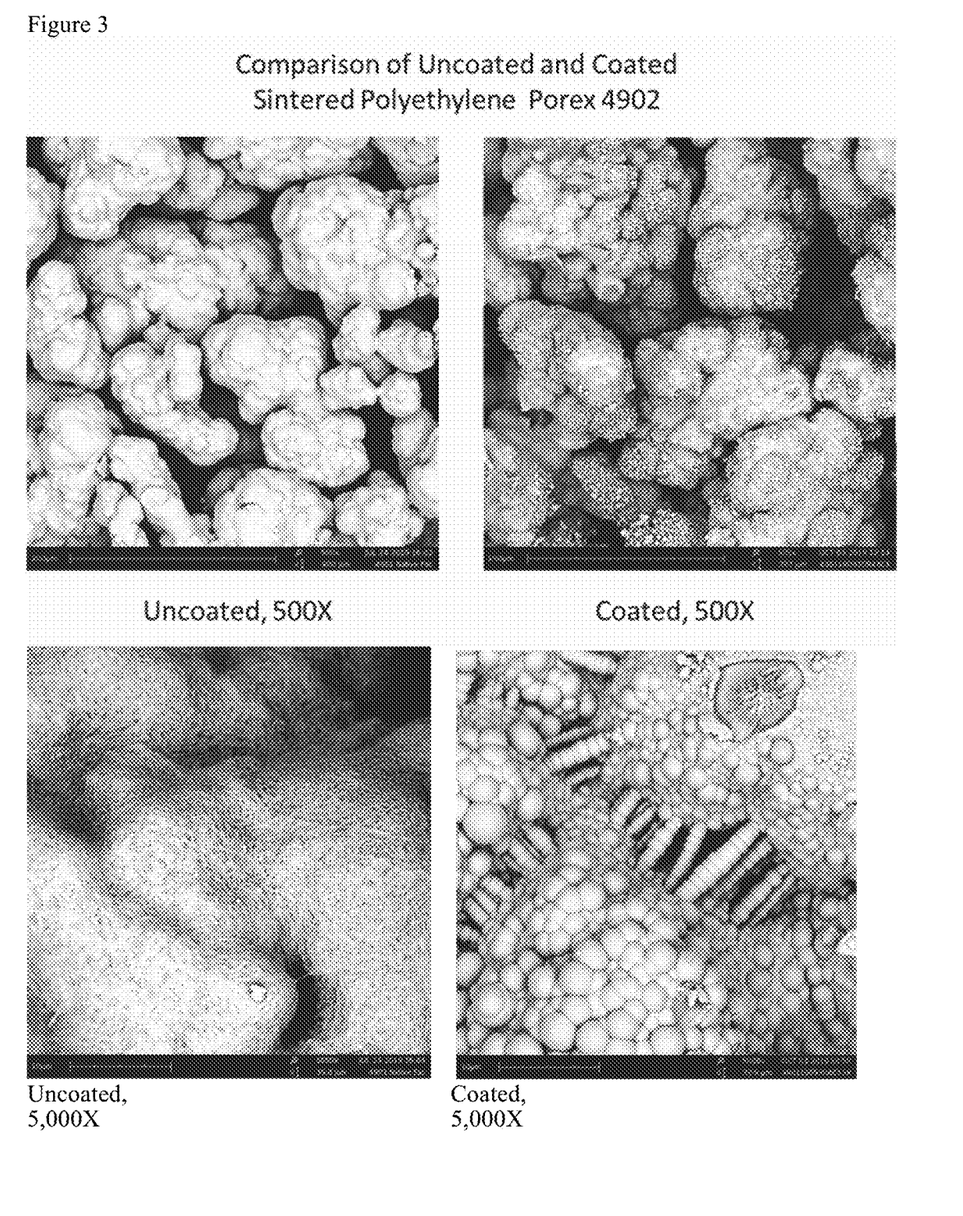
FIG. 3 provides scanning electron micrographs comparing the uncoated and coated sintered polyethylene (PE) discs at different magnifications.

In a 25 ml bottle, discs of 0.31" diameter Porex 4902 sintered polyethylene (0.25" thick, pore size 15-45 microns) were combined with an equal mass of a monomer solution containing 2.0 parts n-heptane and 1.0 part DVB (80% purity) with 1% AIBN (of the divinylbenzene mass). The vial was heated to 65° C. and agitated for 44 hours. The vial was removed and the discs rinsed with 15 mL of acetone (twice) and dried. Mass increase of the coated discs was about 33% indicating nearly complete uptake of the polymer onto the sintered polyethylene discs. The 33% increase in mass was derived from the fact that the monomer solution was 33% DVB (1 part DVB/2 parts n-heptane+1 part DVB) and the sintered polyethylene was an equal mass to the monomer solution. Scanning electron micrographs comparing the uncoated and coated sintered polyethylene discs are shown in FIG. 3.

Figure 4:
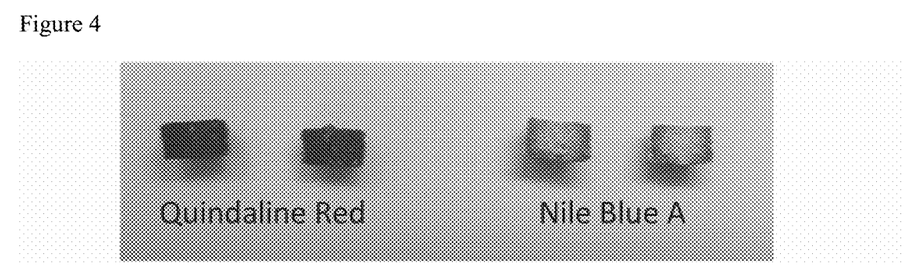
FIG. 4 is a picture of Porex 4902 sintered polyethylene coated with porous DVB cut in half after being soaked in two different dyes.

To test the ability of the coated 4902 discs to absorb dyes, discs were wetted with isopropyl alcohol, and then placed into two dye solutions, 100 ppm Quinaldine Red and 100 ppm of Nile Blue A dye. The discs were allowed to soak for 30 minutes, removed and rinsed with deionized water to remove dye in the open pores of the sintered polyethylene. The discs were cut longitudinally and FIG. 4 shows a picture of the results. The polymer layer greatly increased the surface area of the sintered PE, allowing for efficient dye adsorption.

Example 4. Dye Adsorption on Sintered Rod with a Functional Polymer Layer

Molded sintered polyethylene rods approximately 5 mm diameter and 21 mm length rods were coated with a monomer solution containing 2.0 parts n-heptane and 1.0 part DVB (80% purity) with 1% AIBN (of the divinylbenzene mass). Rods of three different porosities A, B and C were coated with the monomer solution and tested with 3 mL of 10 ppm Nile Blue A for adsorption efficiency. The adsorption efficiency was measured by determining the difference in the visible absorbance of the original dye solution and the dye solution after the coated rods (probes) was placed in contact and agitated for 60 minutes. The results are shown in the table below.

| Coated Probe | Nominal Pore Size (microns) | % Dye Adsorbed |
| --- | --- | --- |
| A | 40-70 | 99 |
| B | 75-120 | 78 |
| C | 100-145 | 100 |

Figure 5:
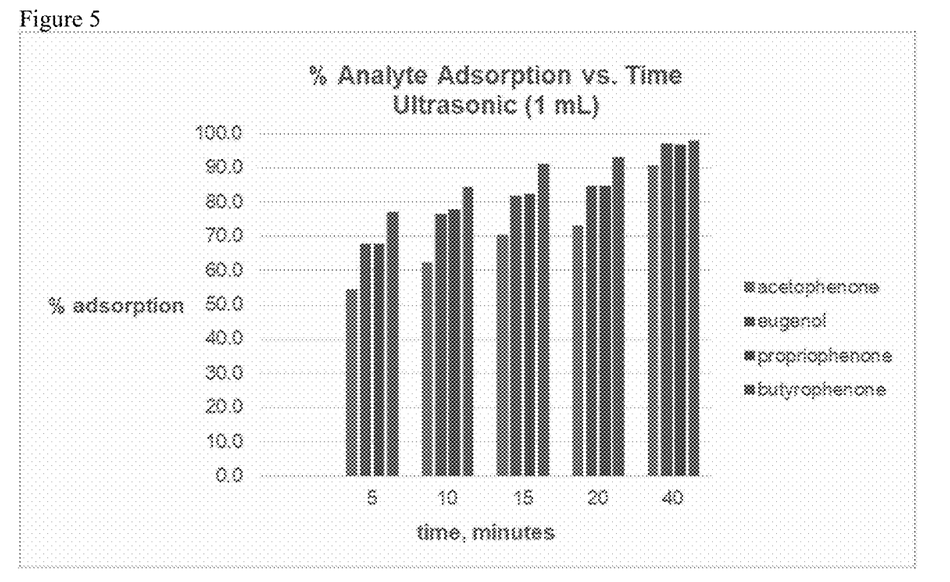
FIG. 5 is a graph of the percentage of analyte adsorbed from a solution into a coated disc.

Example 5. Adsorption of Alkyl Phenones on a Sintered Polyethylene with a DVB Functional Polymer Layer Discs (0.21" diameter×0.12" thick) were punched from Porex 4901 sintered polyethylene sheet. The discs were then coated with a monomer solution containing 2.0 parts n-heptane and 1.0 part DVB (80% purity) with 0.1% AIBN (of the divinylbenzene mass). After polymerization, the discs were cleaned with acetone and dried. Each coated disc contained about 10 mg of the DVB layer. Five each of the coated discs were inserted onto a stainless steel rod which was 0.026 inches diameter by 3.5 inches long. A solution containing 10 ppm of four alkyl phenones (acetophenone, eugenol, propriophenone and butyrophenone) was analyzed by high performance liquid chromatography (HPLC) with UV detection at 230 nm. The coated discs on the rod were inserted into 1 mL of the alkyl phenone solution, then placed in an ultrasonic bath for 5 minutes. The discs were then removed and the solution analyzed by HPLC. This process was repeated at 10, 20, 30 and 40 minutes. The percentage of each analyte adsorbed from the solution onto the discs is shown in FIG. 5. Each bar of a cluster of bars on FIG. 5 are arranged and represented in order of moving from left to right respectively as acetophenone, eugenol, propriophenone, and butyrophenone.

Figure 6:
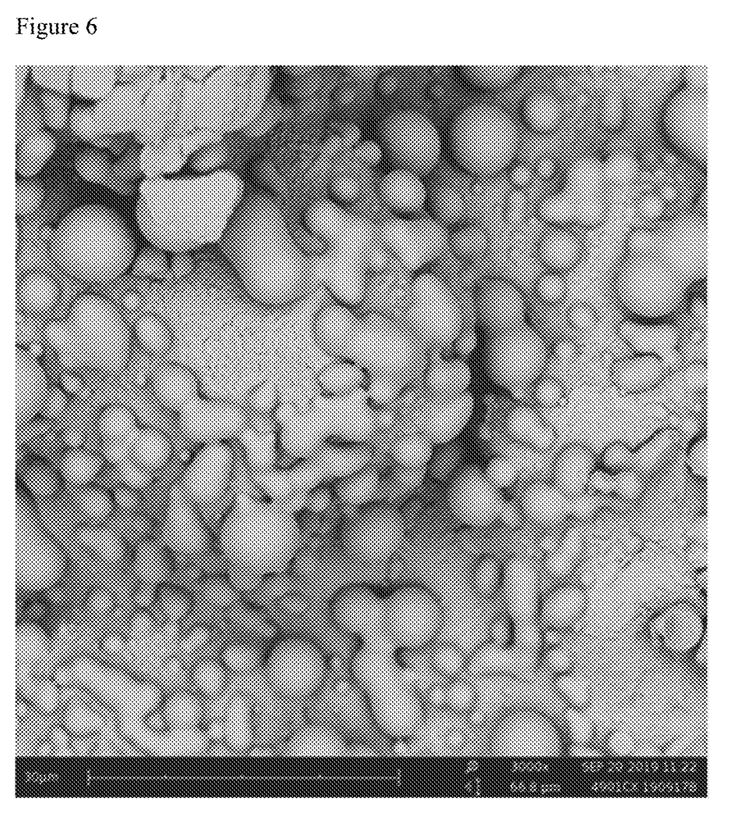
FIG. 6 is a scanning electron micrograph of the polymer layer on the sintered PE substrate

Example 6. Sintered PE with Styrene/Divinylbenzene and Latex Functional Polymer Layer A solution consisting of 96% styrene, 4% DVB (80% purity) and 1% AIBN (of the combined styrene and DVB mass) was diluted with 2 parts n-heptane (w/w). The monomer/n-heptane solution was then added to an equal mass of 0.2" diameter Porex 4901 sintered polyethylene discs, sealed in a glass bottle and placed in an oven at 65° C. for 46 hours. After the discs were coated with the resulting styrene/DVB polymer, the discs were rinsed in acetone and then dried. FIG. 6 shows the polymer layer on the sintered PE substrate.

Figure 7:
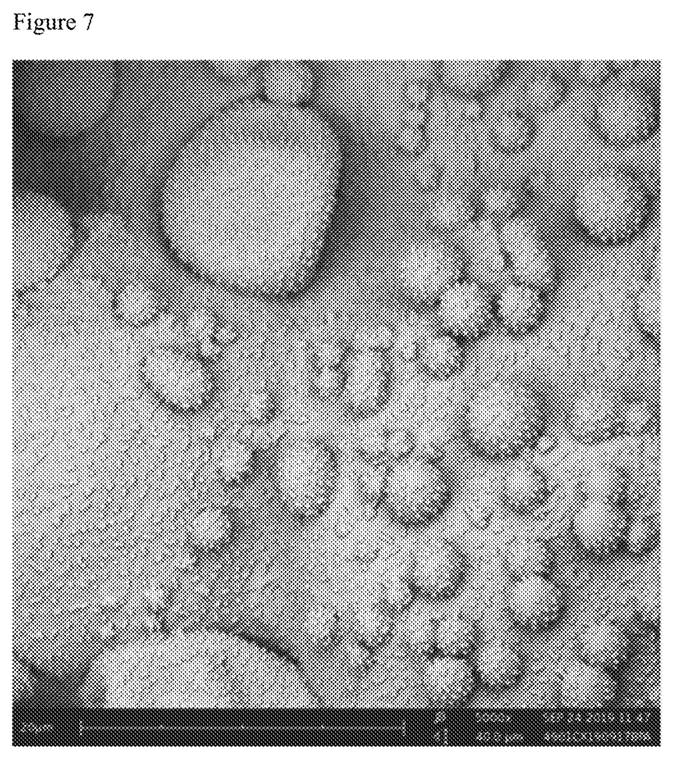
FIG. 7 is a scanning electron micrograph of latex particles electrostatically attached to the sulfonated polymer layer of a coated disc.

Next, the coated substrate was combined with concentrated sulfuric acid (10 parts of sulfuric acid to 1 part polymer coated substrate, w/w), and placed in a 95° C. oven for one hour. Upon removal from the oven, the disc was a light brown color indicating that the styrene/DVB polymer had been sulfonated. The sulfonated discs are now negatively charged and are water wettable. A portion of the sulfonated discs in the hydronium form were then later used as described in Example 9. The sulfonated discs were neutralized in sodium hydroxide and rinsed with deionized water. Next, a solution of colloidal anion exchange latex particles polymer of approximately 400 nm diameter was added to the sulfonated discs. Examples of latex particles may be found in U.S. Pat. Nos. 5,532,279; 10,118,171; and 4,101,460, hereby incorporated by reference in their entirety. Since these anion exchange latex particles are positively charged, the latex particles electrostatically attached to the negatively charged sulfonated polymer layer of the discs, as shown in FIG. 7.

This anion exchange latex agglomerated coated sintered polyethylene can be used to extraction anions and cations from solutions.

Example 7 Aminoacrylate Grafting on a Sintered Polyethylene with a DVB Functional Polymer Layer Porex 4901 (0.21" diameter×0.125" thick) discs were coated with 2.0 n-heptane:1.0 DVB (80% purity) with 1% AIBN (of the divinylbenzene) as described in example 3. An equal mass of the monomer solution was added to the Porex discs and reacted at 65° C. for 48 hours. After cleaning and drying with acetone, the coating efficiency was determined to be 99%, with each disc containing about 9.2 mg of porous DVB.

For grafting, a solution of 2-[methacryloyloxy)ethyl]trimethylammonium chloride (MAO) was prepared by adding 1.3 g of 75% MAO to 98.7 g of deionized water. To the diluted MAO monomer solution, 0.13 g of the free radical thermal initiator, 4,4'-azobis(4-cyanopentanoic acid)

(ABCPA) was added. The grafting procedure consisted of adding 10 each of the 4901 DVB coated disc (92 mg DVB total) into 3 separate vials and then adding the MAO monomer at masses of 10, 20 and 30%, respective of the mass of DVB layer.

Three vials were prepared with 10 DVB coated discs in each vial and labeled 2A (10%), 2B (20%) and 2C (30%). The discs were wetted with acetone (about 0.25 mL for 10 discs) and the excess acetone allowed to evaporate so only a small amount of liquid acetone was present. The monomer and initiator solution were then added. The three vials were placed in a 60° C. oven and allowed to polymerize for seven days.

After polymerization, water was added to the discs. The disc wet with water indicating that the grafting reaction had made the discs hydrophilic. The discs were rinsed and ultrasonicated to remove residual monomer or initiator.

Figure 8:
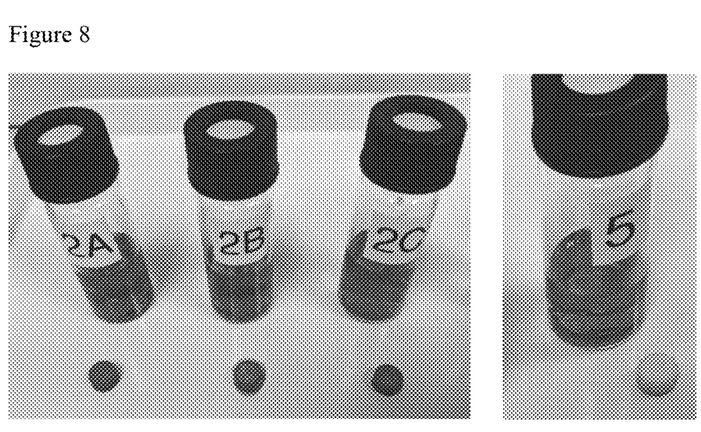
FIG. 8 provides pictures of a dye adsorption experiment of grafted and non-grafted DVB coated discs.

A dye adsorption experiment was done without agitation. One each of the 10, 20, and 30% grafted MAO discs were placed in 4 mL vials and 2.0 mL of 100 ppm acid fuschin in 5 mM HCl added. For reference, a non-grafted DVB coated disc was wetted with acetone and added to 1.5 ml of acid fuschin (Vial 5). After 24 hours, the discs were removed and rinsed with water. FIG. 8 shows that the grafted discs adsorbed significantly more dye than the non-grafted disc (Vial 5). Since the grafting produced an anion exchange functionality, and the dye is anionic, the grafted discs are expected to retain more dye than the non-grafted disc.

Example 8. SEM of Coated Substrate

Twenty-nine sintered polyethylene discs (Porex 4901) with a total mass of 1.00 g and dimensions of 0.21" diameter and a height of 0.22" were combined with 1.00 g of a monomer solution of 0.666 g of n-heptane, 0.330 g of technical grade divinylbenzene (80% purity), and 0.0033 g of thermal radical initiator, azobisisobutyronitrile (AIBN). The discs and monomer solution were placed in a 65° C. oven, agitated, and allowed to polymerize for 24 hours. The porous DVB polymer coated discs were removed from the oven, rinsed in three aliquots of 20 mL acetone and then dried in the 65° C. oven for one hour. A single disc was cut in half with a single edge razor and then prepared for imaging by sputtering with gold using a Thermo Fisher Scientific Phenom World ProX scanning electron microscope. A representative image is shown in FIG. 9. From this image, a cross-sectional view of the porous polymer coating with a rough surface surrounding a sintered polyethylene substrate. The thickness of the porous polymer layer ranges from about 2 microns to 10 microns.

Example 9. Flow Through Extraction

Figure 10:
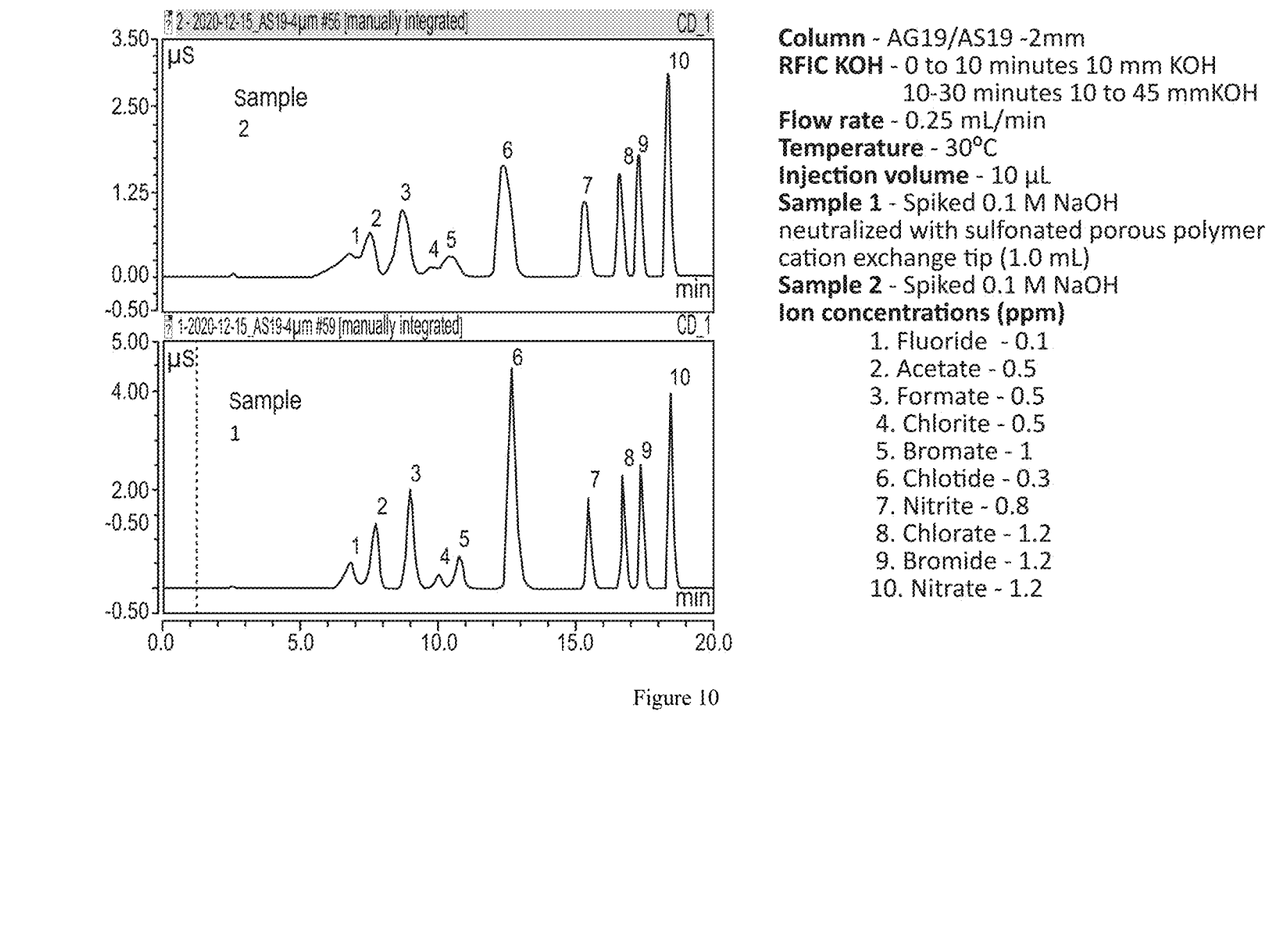
FIG. 10 are chromatograms of a sample of anions analyzed by ion chromatography using Reagent Free Ion Chromatography (RFIC).

A 1.00 mL pipette tip was fitted with a cation exchange (hydronium form) coated substrate that was sulfonated as described in Example 6, but without the colloidal latex anion exchange particles. The coated substrate was used in a flow-through mode to neutralize a basic sample prior to anion analysis by ion chromatography. FIG. 10 shows an ion chromatogram obtained after passing 1.00 mL of Sample 1 containing anions in 0.1M sodium hydroxide through the pipette tip containing the cation exchange coated substrate to neutralize the sodium hydroxide and then injected into the ion exchange system. By neutralizing the sodium hydroxide, well resolved peaks with high chromatographic efficiencies are obtained. Sample 2 has the same composition as sample 1, but sample 2 was analyzed without neutralization using the flow-through pipette tip containing the cation exchange coated substrate. The lower chromatogram of FIG. 10 that analyzed untreated Sample 2 showed poorer peak resolution for peaks 1 to 5.

What is claimed:

1. A coated substrate, comprising:
    a polyolefin substrate having a functional polymer layer disposed thereon;
    wherein the polyolefin substrate has a flow through pore structure with a pore size ranging from about 5 microns to about 250 microns; and
    the functional polymer layer having a thickness ranging from about 1 micron to about 20 microns, and a layer pore structure having a pore size ranging from about 1 nm to about 100 nm,
    wherein the functional polymer layer is not covalently bound to the polyolefin, and the functional polymer layer has a surface area of from about 25 $m^2/g$ to about 800 $m^2/g$,
    wherein the functional polymer layer is formed from one or more porogen, one or more monomer, and a polymerization initiator, and the monomer comprises styrene, divinylbenzene, vinylbenzylchloride, acrylates, methacrylates, ethylvinylbenzene, derivatives thereof, and combinations thereof.

2. The coated substrate of claim 1, wherein a mass ratio of the functional polymer layer to the polyolefin substrate ranges from about 1/100 to about 50/100.

3. The coated substrate of claim 1, wherein the coated substrate has a pore volume of 5% to 70%.

4. The coated substrate of claim 1, wherein the polyolefin comprises polyethylene.

5. The coated substrate of claim 1, wherein the functional polymer is crosslinked.

6. The coated substrate of claim 1, wherein the functional polymer layer is homogenous.

7. The coated substrate of claim 1, wherein the polyolefin substrate comprises a form selected from fibers, sheets, screens, woven mesh, and sintered particles.

8. The coated substrate of claim 1, wherein the polyolefin substrate comprises sintered particles.

9. The coated substrate of claim 1, further comprising one or more additional functional polymer layers on the functional polymer layer.

10. The coated substrate of claim 9, wherein the one or more additional functional polymer layers are hydrophobic, hydrophilic, or have ion exchange functionality.

11. The coated substrate of claim 1, wherein the functional polymer layer comprises negatively charged sulfonate groups, wherein positively charged anion exchange particles are ionically bound to the negatively charged sulfonate groups.

12. The coated substrate of claim 1, wherein the functional polymer layer comprises positively charged amino groups, wherein negatively charged cation exchange particles are ionically bound to the positively charged amino groups.

13. The coated substrate of claim 1, formed by the process of:
    providing the polyolefin substrate,
    combining one or more porogen, one or more monomer, and a polymerization initiator with the polyolefin substrate to form a mixture,
    initiating polymerization of the monomer to form the functional polymer layer, and
    agitating the mixture during at least part of the polymerization.

14. The coated substrate of claim 13, wherein the porogen comprises a solvent selected from aliphatics, cycloaliphatics, aromatic hydrocarbons, halogenated aliphatics, and halogenated aromatics.

15. The coated substrate of claim 13, wherein the one or more porogen comprises n-heptane and the one or more monomer comprises divinylbenzene, and the porogen to monomer weight ratio ranges from 1/1 to 20/1.

16. The coated substrate of claim 13, wherein the functional polymer layer is formed in a sealed container while the mixture is agitated.

17. The coated substrate of claim 13, wherein the porogen to monomer weight ratio is 1/10 to 400/10, by mass.

18. The coated substrate of claim 13, wherein the ratio of monomer to substrate is 1/100 to 50/100, by mass.

19. The coated substrate of claim 13, wherein the Hildebrand solubility parameters of the porogen and the monomer differ by 4 or less.

20. The coated substrate of claim 1, wherein the polyolefin substrate comprises polyethylene, polypropylene, polymethylpentene, polynorbornene, cyclic olefin copolymers, or combinations thereof.

21. The coated substrate of claim 1, wherein the polyolefin substrate comprises polyethylene, polypropylene, or a combination thereof.

* * * * *